US012754069B2

(12) United States Patent
Zinoviev et al.

(10) Patent No.: US 12,754,069 B2
(45) Date of Patent: Oct. 6, 2026

(54) LASER MEASUREMENT APPARATUS HAVING A REMOVABLE AND REPLACEABLE BEAM DUMP

(71) Applicant: OPHIR OPTRONICS SOLUTIONS LTD., Jerusalem (IL)

(72) Inventors: Oleg Zinoviev, Jerusalem (IL); Karol Sanilevici, Jerusalem (IL); Alexandr Superfin, Keriyat Gat (IL)

(73) Assignee: OPHIR OPTRONICS SOLUTIONS LTD., Jerusalem (IL)

( * ) Notice: Subject to any disclaimer, the term of this patent is extended or adjusted under 35 U.S.C. 154(b) by 145 days.

(21) Appl. No.: 18/986,982

(22) Filed: Dec. 19, 2024

(65) Prior Publication Data

US 2025/0116550 A1 Apr. 10, 2025

Related U.S. Application Data

(63) Continuation of application No. 18/410,646, filed on Jan. 11, 2024, now Pat. No. 12,181,337, which is a (Continued)

(51) Int. Cl.

| | |
|---|---|
| ***G01J 1/42*** | (2006.01) |
| ***G01J 1/02*** | (2006.01) |
| ***G01J 1/04*** | (2006.01) |

(52) U.S. Cl.

CPC ........... *G01J 1/4257* (2013.01); *G01J 1/0271* (2013.01); *G01J 1/0403* (2013.01); *G01J 1/0407* (2013.01)

(58) Field of Classification Search

CPC ...... G01J 1/4257; G01J 1/0271; G01J 1/0403; G01J 1/0407

See application file for complete search history.

(56) References Cited

U.S. PATENT DOCUMENTS

| | | | |
|---|---|---|---|
| 5,124,993 | A | 6/1992 | Braunlich et al. |
| 6,000,801 | A | 12/1999 | Dillon et al. |

(Continued)

FOREIGN PATENT DOCUMENTS

| | | | |
|---|---|---|---|
| WO | 2011023765 | A1 | 3/2011 |
| WO | 2018039248 | A1 | 3/2018 |
| WO | 2020159666 | A1 | 8/2020 |

OTHER PUBLICATIONS

The PCT/IL2023/050031 International Search Report, mailed May 15, 2023 (4 pages).

(Continued)

*Primary Examiner* — Georgia Y Epps
*Assistant Examiner* — Don J Williams
(74) *Attorney, Agent, or Firm* — Edward Scott Trask

(57) ABSTRACT

The present application discloses various embodiments of an apparatus configured to measure characteristics of a beam of laser energy. In one embodiment, the apparatus includes a housing having a first compartment and a second compartment formed therein. Optical modules having optical sensors configured to measure characteristics of the beam of laser energy are mounted in the first compartment. A removable and replaceable beam dump configured to absorb most of the beam is positioned in the second compartment. The housing may include a housing member positioned between the first and second compartments, to reduce the transfer of thermal energy between them. The removability/replaceability of the beam dump enables operation of the apparatus without active cooling of the beam dump assembly, simplifying the apparatus and protecting the optical sensors in the first compartment.

24 Claims, 3 Drawing Sheets

Related U.S. Application Data continuation of application No. 17/576,059, filed on Jan. 14, 2022, now Pat. No. 11,874,163.

(56) References Cited

U.S. PATENT DOCUMENTS

| | | | | |
|---|---|---|---|---|
| 6,339,604 | B1 | 1/2002 | Smart | |
| 6,462,306 | B1 | 10/2002 | Kitai et al. | |
| 6,831,936 | B1 | 12/2004 | Smart | |
| 7,133,182 | B2 | 11/2006 | Johnson et al. | |
| 7,469,081 | B2 | 12/2008 | Byer et al. | |
| 7,528,349 | B1 | 5/2009 | Gotkis et al. | |
| 7,955,905 | B2 | 6/2011 | Cordingley et al. | |
| 8,648,277 | B2 | 2/2014 | Alpay et al. | |
| 9,521,949 | B2 | 12/2016 | Bor et al. | |
| 2004/0146078 | A1 | 7/2004 | Nield et al. | |
| 2004/0251243 | A1 | 12/2004 | Lizotte et al. | |
| 2009/0057567 | A1 | 3/2009 | Bykanov et al. | |
| 2010/0301024 | A1 | 12/2010 | Unrath | |
| 2011/0063810 | A1 | 3/2011 | Chen et al. | |
| 2015/0029497 | A1* | 1/2015 | Anikitchev | G01J 1/0477 356/236 |
| 2020/0400965 | A1 | 12/2020 | Kirkham et al. | |
| 2021/0063238 | A1* | 3/2021 | Palumbo | G02B 5/003 |

OTHER PUBLICATIONS

The PCT/IL2023/050031 Written Opinion, mailed May 15, 2023 (5 pages).
The International Search Report issued to PCT/US2021/054014 on Jan. 10, 2022, 4 pages.
Extended European Search Report issued in EP counterpart application 23740181.5 dated Nov. 25, 2025 (7 pages).

* cited by examiner

LASER MEASUREMENT APPARATUS HAVING A REMOVABLE AND REPLACEABLE BEAM DUMP

CROSS-REFERENCE TO RELATED APPLICATIONS

The present application is a Continuation of U.S. application Ser. No. 18/410,646 filed on Jan. 11, 2024, entitled "Laser Measurement Apparatus Having a Removable and Replaceable Beam Dump", which is a Continuation of U.S. application Ser. No. 17/576,059 filed on Jan. 14, 2022, now U.S. Pat. No. 11,874,163, entitled "Laser Measurement Apparatus Having a Removable and Replaceable Beam Dump", the entire contents of both are incorporated by reference herein.

BACKGROUND

High power lasers are used in a wide variety of applications, including materials processing applications such as cutting, welding, engraving and additive manufacturing. Accurate measurement of laser beam properties is important so that these processes can be controlled. Laser measurement instruments for this purpose include optical power meters, optical energy meters, and laser beam profilers. In some applications, significant attenuation of the high power laser beam is required in order to avoid damage to these instruments. To avoid attenuation of the laser beam, a significant percentage of the beam power may be directed to a beam dump that is configured to absorb the portion of the beam that is not being measured.

While prior art beam dump systems have proven useful in the past, a number of shortcomings have been identified. In high power applications (e.g., 0.5 kW and above) a beam dump can become very hot in a short time. The accuracy of the laser measurement instruments may be affected by excess heat. Solutions to this problem include forced air convention or liquid cooling using air-water heat exchangers. However, convective cooling systems can lead to problems within the closed chambers or environments that surround high power laser processing systems, including the accretion of dust onto certain laser optics. For example, in some applications, forced-air cooling systems can blow debris (e.g., dust or processing byproducts) onto beam delivery optics or may cause damage to electronics. In other applications, liquid cooling or forced-air convention systems may be impractical or not available due to space constraints or lack of access to utilities.

In light of the foregoing, there is an ongoing need for a laser measurement apparatus having a beam dump capable of handling high power laser beams without the need for forced-air convection, liquid cooling, or any other form of active heat removal.

SUMMARY

The present application discloses various embodiments of a laser measurement apparatus configured to measure characteristics of an incident beam of laser energy.

In one embodiment, the laser measurement apparatus comprises a housing including at least one first housing member and at least one second housing member, a first compartment formed in the housing, a second compartment formed in the housing, a first optical module mounted in the first compartment, wherein the first optical module is configured to measure a first characteristic of the beam of laser energy. A first beam dump assembly is removably positioned in the second compartment, wherein the first beam dump assembly is configured to absorb a portion of the beam of laser energy. The laser measurement apparatus may also include an aperture assembly mounted in the first housing member, wherein the aperture assembly is configured to allow a beam of laser energy to propagate therethrough into the first compartment. An intermediate housing member may be formed in the housing, wherein the intermediate housing member is operative to reduce the transfer of thermal energy between the second compartment and the first compartment. The first characteristic of the beam of laser energy may be beam diameter, beam shape, beam parameter product, optical power, optical intensity, beam pulse power, beam pulse energy, beam waist, or beam radius. In one embodiment, the first optical module includes a laser beam profiler. The laser measurement apparatus may further include a fourth optical module configured to measure a second characteristic of the beam of laser energy. The second characteristic of the beam of laser energy may be beam diameter, beam shape, beam parameter product, optical power, optical intensity, beam pulse power, beam pulse energy, beam waist, or beam radius. The fourth optical module may include an optical power meter.

In other embodiments, the first optical module includes an optical component configured to receive the beam of laser energy and allow a transmitted first optical module signal to propagate therethrough. The laser measurement apparatus may include an optical element, wherein the optical element is configured to receive the transmitted first optical module signal and reflect a reflected window optical signal to the fourth optical module and allow a transmitted optical window signal to propagate therethrough into the second compartment.

In one embodiment, the laser measurement apparatus may further include a second optical module mounted in the first compartment, the second optical module including an optical component configured to allow the transmitted first optical module signal to propagate therethrough. The optical component may be configured to attenuate the transmitted first optical module signal. The second optical module may include a removable optical mount configured to retain the optical component. An optical mount receiver configured to removably retain the removable optical mount therein may be provided. The first beam dump assembly may include a beam dump body and an absorber in thermal communication with the beam dump body. In various embodiments, the first beam dump assembly is configured to be removed from the second compartment so that a second beam dump assembly can be placed in the second compartment. In some embodiments, wherein the first beam dump assembly further comprises a temperature indicator configured to indicate a temperature of the beam dump body.

In other embodiments, laser measurement apparatus includes a housing, a first optical module including a first optical sensor positioned in the housing, wherein the first optical module is configured to measure a first characteristic of a beam of laser energy. The laser measurement apparatus further includes a first beam dump assembly removably positioned in the housing, the first beam dump assembly configured to absorb a portion of the beam of laser energy. The first beam dump assembly is configured to be removed from the housing so that a second beam dump assembly can be placed in the housing. The first optical module may be selected from a group consisting of apertures, attenuators, beam dumps, beam profiling cameras, beam profilers, optical power meters, optical energy meters, beamsplitters, filters, mirrors, lenses, and windows. The first characteristic of the beam of laser energy may be selected from a group consisting of beam diameter, beam shape, beam parameter product, optical power, optical intensity, beam pulse power, beam pulse energy, beam waist, and beam radius. In some embodiments, comprising a temperature indicator in thermal communication with the first beam dump assembly, wherein the temperature indicator is configured to indicate a temperature of the beam dump assembly. The laser measurement apparatus may further include a fourth optical module positioned in the housing configured to measure a second characteristic of the beam of laser energy. The second characteristic of the beam of laser energy may be beam diameter, beam shape, beam parameter product, optical power, optical intensity, beam pulse power, beam pulse energy, beam waist, and beam radius.

BRIEF DESCRIPTION OF THE DRAWINGS

Various embodiments of a laser measurement apparatus having a removable beam dump will be explained in more detail by way of the accompanying drawings, wherein.

DETAILED DESCRIPTION

Figure 1:
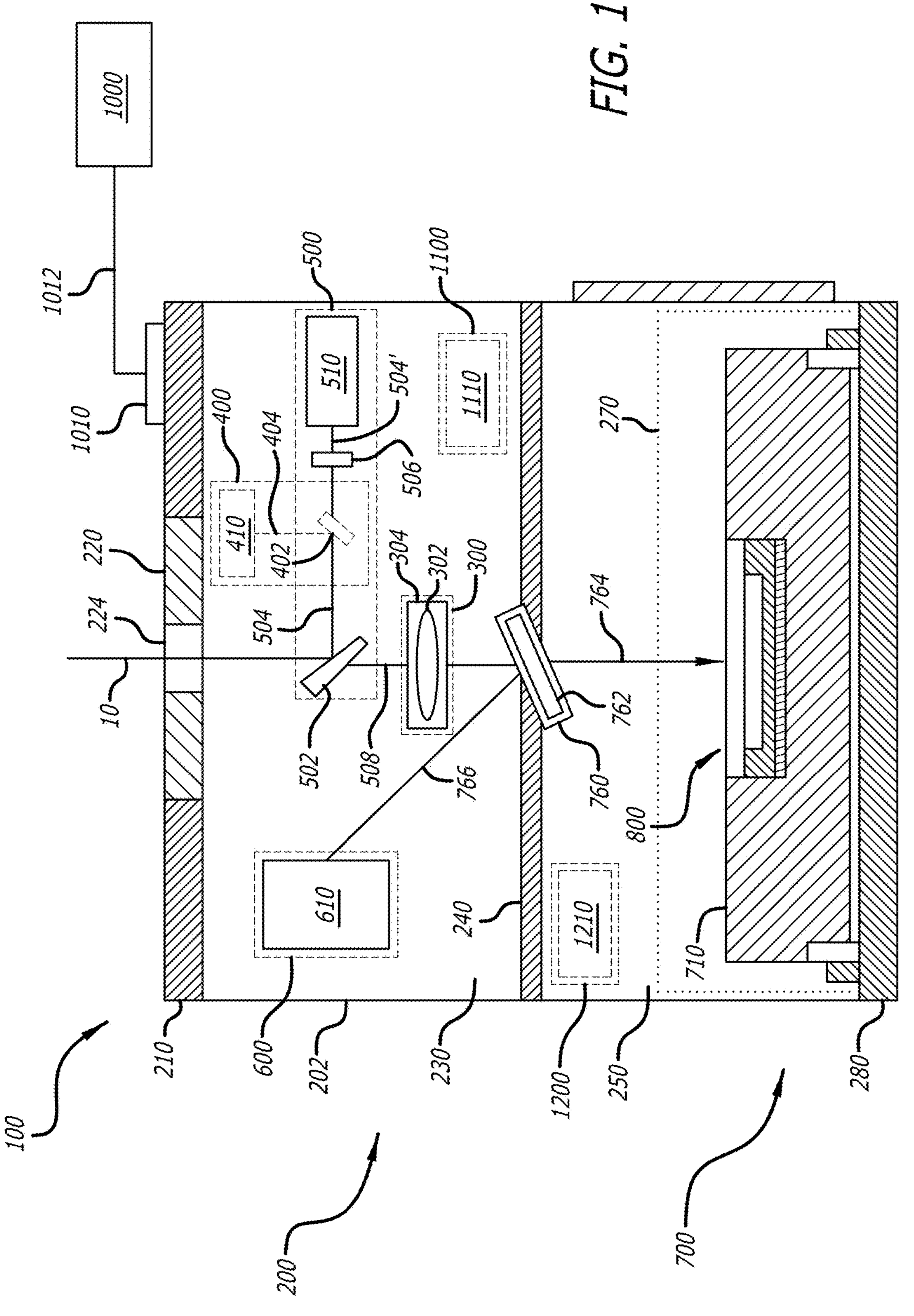
FIG. 1 shows a cross-sectional view of a laser measurement apparatus, according to one embodiment.

Example embodiments are described herein with reference to the accompanying drawings. Unless otherwise expressly stated, in the drawings the sizes, positions, etc., of components, features, elements, etc., as well as any distances therebetween, are not necessarily to scale, but are exaggerated for clarity. In the drawings, like numbers refer to like elements throughout. Thus, the same or similar numbers may be described with reference to other drawings even if they are neither mentioned nor described in the corresponding drawing. Also, even elements that are not denoted by reference numbers may be described with reference to other drawings.

The terminology used herein is for the purpose of describing particular exemplary embodiments only and is not intended to be limiting. Unless otherwise defined, all terms (including technical and scientific terms) used herein have the same meaning as commonly understood by one of ordinary skill in the art. As used herein, the singular forms "a," "an" and "the" are intended to include the plural forms as well, unless the context clearly indicates otherwise. It should be recognized that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. Unless indicated otherwise, terms such as "first," "second," etc., are only used to distinguish one element from another. For example, one coupler could be termed a "first coupler" and similarly, another node could be termed a "second coupler", or vice versa.

Unless indicated otherwise, spatially relative terms, such as "below," "beneath," "lower," "above," and "upper," "opposing," and the like, may be used herein for ease of description to describe one element or feature's relationship to another element or feature, as illustrated in the FIGS. It should be recognized that the spatially relative terms are intended to encompass different orientations in addition to the orientation depicted in the FIGS. For example, if an object in the FIGS. is turned over, elements described as "below" or "beneath" other elements or features would then be oriented "above" the other elements or features. Thus, the exemplary term "below" can encompass both an orientation of above and below. An object may be otherwise oriented (e.g., rotated 90 degrees or at other orientations) and the spatially relative descriptors used herein may be interpreted accordingly.

The paragraph numbers used herein are for organizational purposes only and, unless explicitly stated otherwise, are not to be construed as limiting the subject matter described. It will be appreciated that many different forms, embodiments and combinations are possible without deviating from the spirit and teachings of this disclosure and so this disclosure should not be construed as limited to the example embodiments set forth herein. Rather, these examples and embodiments are provided so that this disclosure will be thorough and complete, and will convey the scope of the disclosure to those skilled in the art.

Measurement of high power laser beams presents a number of challenges. High power lasers are being used in an increasing number of applications that require precise laser power and energy control at the point where the laser beam interacts with the material that is being processed. In general, laser measurement instruments can be vulnerable to damage from high temperatures, so these instruments should ideally be thermally isolated. While some beam dumps may be actively cooled (e.g., by liquid cooling, forced air convection cooling or thermoelectric cooling), such cooling systems can be expensive, bulky, and may leak water or air into the laser processing apparatus that they are installed in.

In the embodiments described below, an improved high power laser measurement apparatus is disclosed. Its advantages include a small footprint and volume, the capability of long exposure to high power lasers, and either rapid or long exposure power measurements without active cooling (e.g., having no fans or water pipes). In some applications, the measurement instruments require a long exposure time. The apparatus provides separate compartments for the laser measurement instruments and the beam dump, thereby protecting the laser measurement instruments from contamination and damage from dust and debris from the ambient environment. Providing a separate compartment for the instruments also prevents large temperature variations of those instruments that may affect the accuracy of measurement results, and the temperature in the compartment may be controlled using a variety of methods and devices. The apparatus is modular and configurable, so that it can be modified and optimized for a variety of applications (e.g., by providing optics and measurement instruments optimized for each application). For example, when the processing laser is a continuous-wave $CO_2$ laser, the optics in the apparatus can be made of zinc selenide or other materials designed for the mid-infrared (mid-IR) wavelength range of $CO_2$ lasers, and their surface coatings can be tailored for operation at the wavelengths of $CO_2$ lasers. In addition, the type of sensor (e.g., charge-coupled device (CCD), active pixel sensors (CMOS), and the like) used for in these instruments can be selected for use at mid-IR wavelengths. Optical power sensors or power meters may be selected based on their performance at a particular wavelength or range of wavelengths. With regard to the beam dump itself, the absorber material and its coating may be selected for performance at mid-IR wavelengths. If the laser measurement apparatus 100 needs to be used in a laser processing system that has a pulsed UV laser, the apparatus 100 can be reconfigured for use at UV wavelengths by replacing the optics and measurement instruments that are optimized for use at UV wavelengths.

FIG. 1 shows a sectional schematic view of an embodiment of a laser measurement apparatus 100 (also referred to herein as the "apparatus 100"). In the illustrated embodiment, the apparatus 100 includes a housing 200 with a beam dump assembly 700 positioned therein. The housing 200 includes a housing body 202 with an upper housing member 210, a first compartment 230, an intermediate housing member 240 and a housing base 280. A first compartment 230 and a second compartment 250 are formed in the housing body 202, with the second compartment 250 separated from the first compartment 230 by the intermediate housing member 240. In the illustrated embodiment, the intermediate housing member 240 is configured to reduce the transfer of thermal energy between the second compartment 250 and the first compartment 230, thereby preventing damage to the measurement instruments in the first compartment 230. A beam dump receiver 270 configured to removably retain a beam dump assembly 700 therein is formed in the second compartment 250, where the beam dump assembly 700 is supported by the housing base 280.

In the illustrated embodiment, an aperture assembly 220 is mounted in the upper housing member 210, the aperture assembly 220 including an aperture optic 224 configured to allow an incident beam of laser energy 10 to propagate therethrough into the first compartment 230. In the illustrated embodiment, the intermediate housing member 240 is configured to accept at least one optical window assembly 760 therein. In the illustrated embodiment, the optical window assembly 760 includes a housing configured to accept and retain at least one optical component or 762 therein. In this embodiment, the optical window assembly 760 is configured to be removed from the intermediate housing member 240 in order to replace the optical component 762, either due to damage, contamination, or due to reconfiguration of the apparatus 100. In the illustrated embodiment, the optical component 762 is an optical window, though those skilled in the art will appreciate that any type of optical component.

Overall, the apparatus 100 as described in the embodiments below is configured to separate the incident beam of laser energy 10 into multiple optical signals that are, in turn, measured by various optical sensors included in a variety of optical modules. The apparatus 100 is designed and configured such that each of the optical signals measured by an optical sensor is representative of the one or more characteristics and properties of the incident beam of laser energy 10. As such, even though each optical sensor measures a different portion of the incident beam of laser energy 10, the measurement results can be used by the operator to understand the characteristics and properties of the incident beam of laser energy 10. Any number of optical modules may be positioned in first compartment 230. In the illustrated embodiment, the instruments located in the first compartment 230 include a first optical module 500, a second optical module 300, a third optical module 400, and a fourth optical module 600. In the illustrated embodiment, the first optical module 500 includes an optical component 502 configured to reflect (or otherwise direct) a reflected first optical module signal 504 to an optical sensor 510 and allow a transmitted first optical module signal 508 to propagate therethrough. The reflected first optical module signal 504 is representative of the incident beam of laser energy 10, so that any characteristics or properties of the reflected first optical module signal 504 that are measured by the optical sensor 510 are representative of the characteristics or properties of the incident beam of laser energy 10. The transmitted first optical module signal 508 is incident on the second optical module 300 that is configured to allow the transmitted first optical module signal 508 to propagate therethrough to the optical window assembly 760. The optical window assembly 760 is configured to receive the transmitted first optical module signal 508 from the second optical module 300 and allow a transmitted window optical signal 764 to propagate therethrough into the second compartment 250 and reflect a reflected window optical signal 766 to the fourth optical module 600. The reflected window optical signal 766 is also representative of the incident beam of laser energy 10, so that any characteristics or properties of the reflected window optical signal 766 that are measured by the optical sensor 610 are also representative of the incident beam of laser energy 10. Depending on the configuration required by any particular laser processing application, any one of the optical modules may be optional.

In one embodiment, the fourth optical module 600 is provided as an optical power meter having a fourth optical sensor 610 provided as a photodetector configured to measure a percentage of the optical power of the incident beam of laser energy 10 and transmit measurement data representative of the optical power to the controller 1000. In this embodiment, the optical window assembly 760 includes a beamsplitter configured to reflect a portion of the transmitted first optical module signal 508 to the optical power meter 600 as the reflected window optical signal 766 and allow the remaining portion to propagate therethrough as the transmitted window optical signal 764. The ratio of the transmitted window optical signal 764 to the reflected window optical signal 766 can be selected by selectively coating the surfaces of the optical component 762. For example, in the illustrated embodiment, on one surface, the optical component 762 is left uncoated, resulting in approximately 4-5% (depending on the angle of incidence/reflection, the optical material, and the laser wavelength) of the transmitted first optical module signal 508 being reflected to the optical power meter 600 as the reflected window optical signal 766. The opposing surface is coating with an anti-reflective coating configured allow the majority of the portion of the transmitted first optical module signal 508 not reflected by the uncoated surface to propagate into the second compartment 250. Those skilled in the art will appreciate that the coating(s) on the optical component 762 may be configured to reflect any percentage of the transmitted first optical module signal 508 to the optical power meter 600 as the reflected window optical signal 766. Because such a small percentage of the incident beam of laser energy 10 reaches the optical power meter 600 when the fourth optical sensor 610 is provided as an optical power meter thermal disk, the power meter can be provided as one having a fast response time (e.g., less than about 5 seconds). In some cases, measurement of high power laser beams require detectors that can handle these high power levels (e.g., thermal air-cooled or water-cooled power meters), though these detectors often have a large volume or footprint, and have slower response times (e.g., about 30 seconds)

In the illustrated embodiment, the second optical module 300 includes an optical component 302 that is selected to reduce the laser fluence or optical power density (i.e., the laser energy per unit area) reaching the optical window assembly 760 and the beam dump assembly 700, thereby avoiding damage to them. In addition, spreading the optical energy over a larger area incident on the beam dump assembly 700 may optimize the absorption of the optical energy by the beam dump assembly 700. For example, the optical component 302 may be provided as a lens having a short focal length (e.g., 20 mm) so that the focal point (not shown) of the transmitted first optical module signal 508 is located in the region between the optical component 302 and the optical window assembly 760, so that the beam is spread out when it is incident on the optical window assembly 760. The optical component 302 may be provided in any manner desired or beneficial, allowing different lenses to be used, that differ in focal length (e.g., for different input beam divergence, power and beam quality) and in coatings selected for different wavelengths or power densities (e.g., narrow wavelength range coatings that are thinner and more resistant to high power densities). In the illustrated embodiment, the optical component 302 is retained in an optical mount 304 configured to enable the system operator to remove and replace the optical component 302 due to optical damage or system reconfiguration to change the operating wavelength, beam divergence, or other optical properties of the optical component 302.

The optical modules used in the apparatus 100 may include any of a wide variety of optical instruments, including, without limitation, camera-based laser beam profilers, non-contact beam profilers, beam propagation analyzers, scanning-slit beam profilers, pyroelectric array sensors, beam diagnostic cameras, laser beam attenuators, optical power sensors (e.g., optical power meters, optical energy meters, photodetectors, thermopiles and the like). For example, the optical sensor 510 in the first optical module 500 may be configured (or reconfigured) with any of these instruments depending on the type of processing laser used (e.g., operating at different wavelengths, pulse repetition rates, or optical powers). In one embodiment, the optical sensor 510 includes a laser beam profiling camera configured to measure a number of beam characteristics, including without limitation, beam diameter (e.g., FWHM, $1/e^2$), beam waist, beam radius, beam shape, beam parameter product ($M^2$ factor), beam power, beam energy, pulse power, pulse energy, optical intensity, laser fluence (optical energy per unit area), and the like or any combination thereof. In one embodiment, the optical sensor 510 may be provided as the BEAMWATCH® non-contact beam profiling system or the BEAMSQUARED® laser beam propagation analyzer system, both sold by Ophir Optronics Solutions. In another embodiment, the optical sensor 510 may be provided as a pyroelectric array camera, such as the PyroCam™ 4 sold by Ophir Optronics Solutions. In some embodiments, the optical modules may include only optical components, including, without limitation, lenses, filters, mirrors, beamsplitters, optical wedges, optical attenuators, and the like or any combination thereof. Those skilled in the art will appreciate that any variety of optical components may be used in the optical modules described herein.

In the illustrated embodiment, the third optical module 400 includes an optical component 402 configured to direct a third optical module signal 404 to an optical device 410. In one embodiment, the third optical module signal 404 is a portion of the reflected first optical module signal 504 directed away from the first optical module 500, in order to prevent saturation or damage the first optical module 500 (e.g., when the optical sensor 510 in the first optical module 500 is provided as a beam profiling camera). In this embodiment, the optical device 410 is provided as a low power beam dump configured to absorb the third optical module signal 404. In this embodiment, the optical component 402 is provided as a beamsplitter, optical wedge, or leakage mirror configured to direct, deflect, or reflect a portion of the reflected first optical module signal 504 to the beam dump 410. If, for example, the reflected first optical module signal 504 does not require attenuation before reaching the optical sensor 510, the third optical module 400 need not be used.

In some embodiments, the first optical module 500 also includes an optical component 506 configured to condition the reflected first optical module signal 504 and to allow a modified reflected first optical module signal 504' to propagate therethrough to the optical sensor 510. For example, the optical component 506 may be provided as a neutral density filter configured to reduce optical transmission evenly across a portion of a specific wavelength spectrum. When provided as such, the neutral density filter 506 can be chosen to increase the dynamic range of the optical sensor 510. Those skilled in the art will appreciate that the optical component 506 may be provided as any variety of filters, lenses, mirrors, and the like or any combination thereof. The first optical module 500 can also be configured to enable easy replacement of the optical component 506 in case of damage to it, or if the first optical module 500 is reconfigured as described above. In one embodiment, the first optical module 500 and/or the optical sensor 510 are fixed relative to the other components or modules in the housing body 202. In another embodiment, the first optical module 500 and/or the optical sensor 510 are movable relative to the other components or modules in the housing body 202.

In some embodiments, the apparatus 100 may include one or more auxiliary modules 1100 located in the first compartment 230. A wide variety of devices may be used as the auxiliary module 1100. In one embodiment, the auxiliary module 1100 includes a thermal sensor 1110 configured to sense the temperature of any one of the following, the ambient environment in the first compartment 230, the optical modules (e.g., the optical sensor 510), or other devices or components positioned in or in thermal communication with the first compartment 230 and transmit measurement data representative of that temperature to the controller 1000. In this embodiment, based on that measurement data, the controller 1000 can alert the operator if the temperature of any component in the first compartment 230 rises above a threshold level that may cause damage to the optical modules located in the first compartment 230. In another embodiment, the auxiliary module 1100 may be provided as an active cooling system operative to sense and control the temperature of the ambient environment in the first compartment 230, the optical modules, or other devices or components positioned in or in thermal communication with or in thermal communication with first compartment 230. Such an active cooling system may include a temperature sensor (not shown) configured to transmit measurement data to the controller so that the active cooling system can be operated in a closed-loop fashion. In another embodiment, the auxiliary module 1100 may be provided as a filtration system operative to remove dust or debris from the first compartment 230, thereby preventing the accretion of such dust or debris onto the surfaces of the optical elements or other components of the optical modules positioned in the first compartment 230. In yet another embodiment, the auxiliary module 1100 may be provided as a dehumidifier or getter configured to remove gases or vapors from the first compartment 230. In still another embodiment, the auxiliary module 1100 may be provided as a purge gas source or inlet configured to supply or introduce a variety of purge gases (e.g., argon, helium, nitrogen, clean dry air) into the first compartment 230 (e.g., to prevent or control any oxidation of the components therein, or to prevent the accretion of particulates onto any optical surfaces). Those skilled in the art will appreciate that the auxiliary module 1100 may provided as any device or subsystem desired or beneficial to optimize the performance of the apparatus 100, or to enhance the safety of apparatus or its operators.

In some embodiments, the apparatus 100 may include one or more auxiliary modules 1200 located in the second compartment 250. In the illustrated embodiment, the auxiliary module 1200 includes a thermal sensor 1210 configured to sense any one of the following, the temperature of the housing body 202, the ambient environment in the second compartment 250, or any optical modules or other devices that are positioned in or are in thermal communication with the second compartment 250 and transmit measurement data representative of that temperature to the controller 1000. In this embodiment, the controller 1000 can alert the operator if the temperature of the beam dump assembly 700 rises above a threshold level that would indicate that the beam dump assembly 700 should be replaced, if, for example, the temperature indicator 730 (described below) is not functioning properly. In another embodiment, the auxiliary module 1200 may be provided as an interlock system (not shown) operative to shut down the processing laser if the beam dump assembly 700 is removed while the processing laser is operating. Such an interlock system may include one or more proximity sensors (not shown) configured to detect the presence of the beam dump assembly 700 in the beam dump receiver 270. Those skilled in the art will appreciate that the auxiliary module 1200 may provided as any device or subsystem desired or beneficial to optimize the performance of the apparatus 100, or to enhance the safety of the apparatus or its operators.

In the illustrated embodiment, in order to control the operation of and receive data from the optical modules 400, 500, 600, and the auxiliary modules 1100 and 1200, an interface connector 1010 is provided that is in electrical communication with these modules. The interface connector 1010 can be being configured to transmit signals from any of the optical modules and/or the auxiliary modules to a controller 1000 via a communication conduit 1012. In the illustrated embodiment, the connector 1010 is a USB connector, though any variety of connectors may be used. Optionally, the optical modules and the auxiliary modules may be in communication with the controller wirelessly. In some embodiments, the apparatus 100 may include multiple interface connectors or controllers. In other embodiments, the controller 1000 may be located within the housing body 202.

Figure 2:
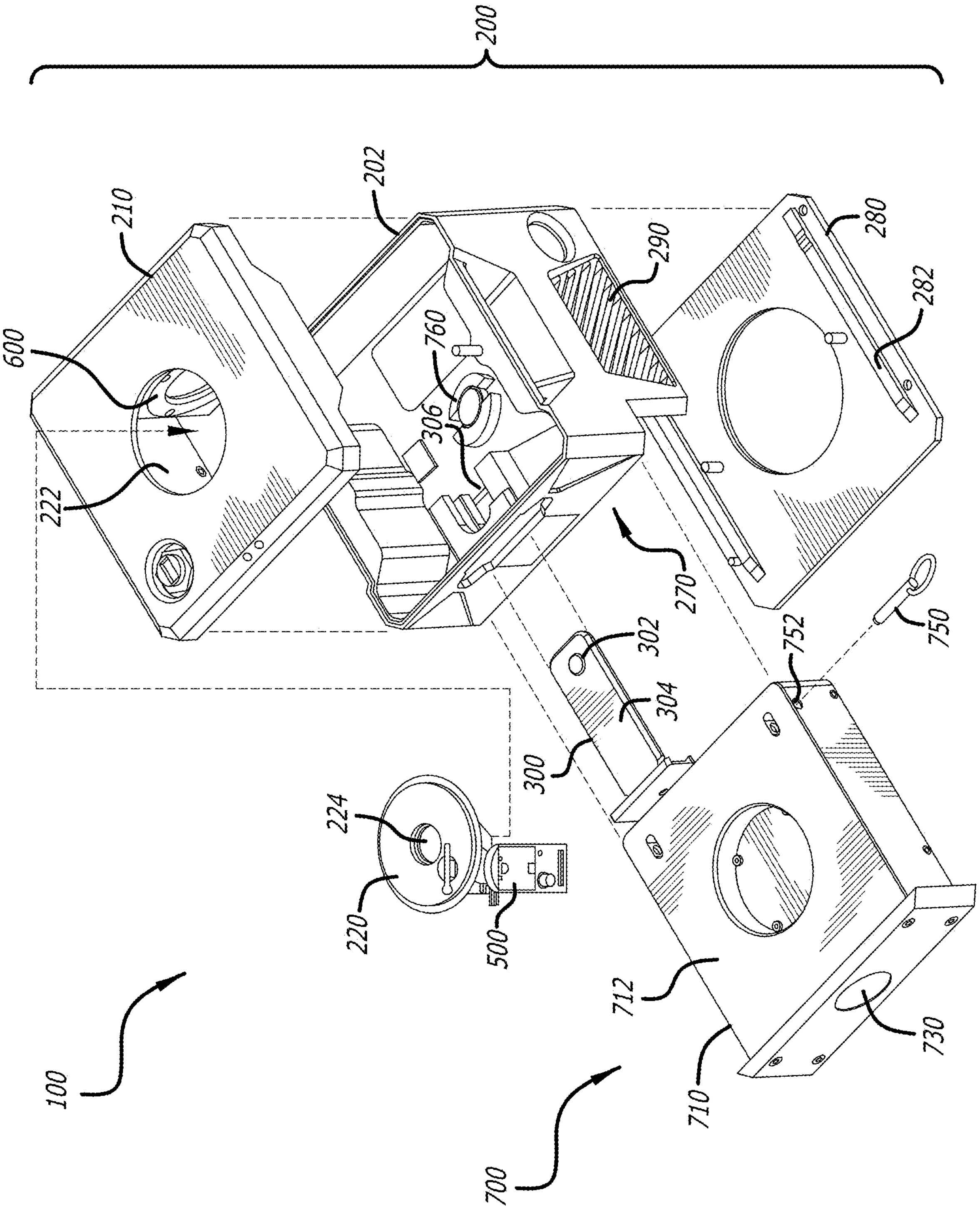
FIG. 2 shows an exploded view of the laser measurement apparatus shown in FIG. 1.

FIG. 2 shows an exploded view of the apparatus 100. In the illustrated embodiment, the upper housing member 210 includes an aperture receiver 222 formed therein, the aperture receiver 222 being configured to accept and retain the aperture assembly 220 therein. The first optical module 500 is mounted to the aperture assembly 220, thereby facilitating access for replacement, service, or reconfiguration of the first optical module 500. Those skilled in the art will appreciate that the first optical module 500 may be mounted to the housing body 202, the upper housing member 210, or elsewhere in the first compartment 230. During service or reconfiguration of the apparatus 100, the aperture assembly 220 can be removed from the aperture receiver 222 and replaced with a new aperture optic 224. Optionally, the upper housing member 210 may include multiple aperture receivers configured to receive any variety of apertures or aperture assemblies.

In the illustrated embodiment, at least one air transfer feature or vent 290 is formed in the housing body 202, the vent 290 configured to allow thermal energy to flow therethrough. In this embodiment, the vent is located in fluid communication with the second compartment 250 so that thermal energy can flow from the beam dump assembly 700 to the ambient environment. One or more fluid forcing devices or fans (not shown) may be provided, the fans configured to create a flow of fluid (e.g., air or other gas) to conduct thermal energy away from the beam dump assembly 700.

In the illustrated embodiment, the second optical module 300 includes an optical mount 304 configured to retain the optical component 302 therein. An optical mount receiver 306 configured to removably retain the second optical module 300 therein is formed in the housing body 202. As such, the second optical module 300 may be removed from the housing body 202 so that the optical component 302 can be replaced (e.g., during reconfiguration of the apparatus 100). In this embodiment, the housing base 280 includes one or more guide members 282 configured to guide the beam dump assembly 700 when it is placed in the beam dump receiver 270. In this embodiment, the fourth optical module 600 is mounted to the upper housing member 210, so that the fourth optical module 600 may be replaced or reconfigured by removing the upper housing member 210. In another embodiment, the fourth optical module 600 may be accessed for removal through the aperture receiver 222, thereby not requiring the removal of the upper housing member 210. In some embodiments, the optical mount 304 may contain multiple optical components mounted therein.

In the illustrated embodiment, the beam dump assembly 700 includes a beam dump housing 710 with a beam dump body 712 configured to absorb the transmitted window optical signal 764. The beam dump assembly 700 includes a indicator, such as a temperature 730 configured to sense the temperature of the beam dump body 712. One or more locking members or pins 750 may be provided, the locking pins 750 configured to traverse through one or more locking passages (not shown) formed in the housing body 202 and engage a corresponding locking pin receiver 752 formed in the beam dump housing 710 or the beam dump body 712, in order to securely retain the beam dump assembly 700 within the beam dump receiver 270. Optionally, the locking pins 750 may also engage one or more other locking passages, devices or other features (not shown) located or formed in the second compartment 250 or the beam dump receiver 270.

Figure 3:
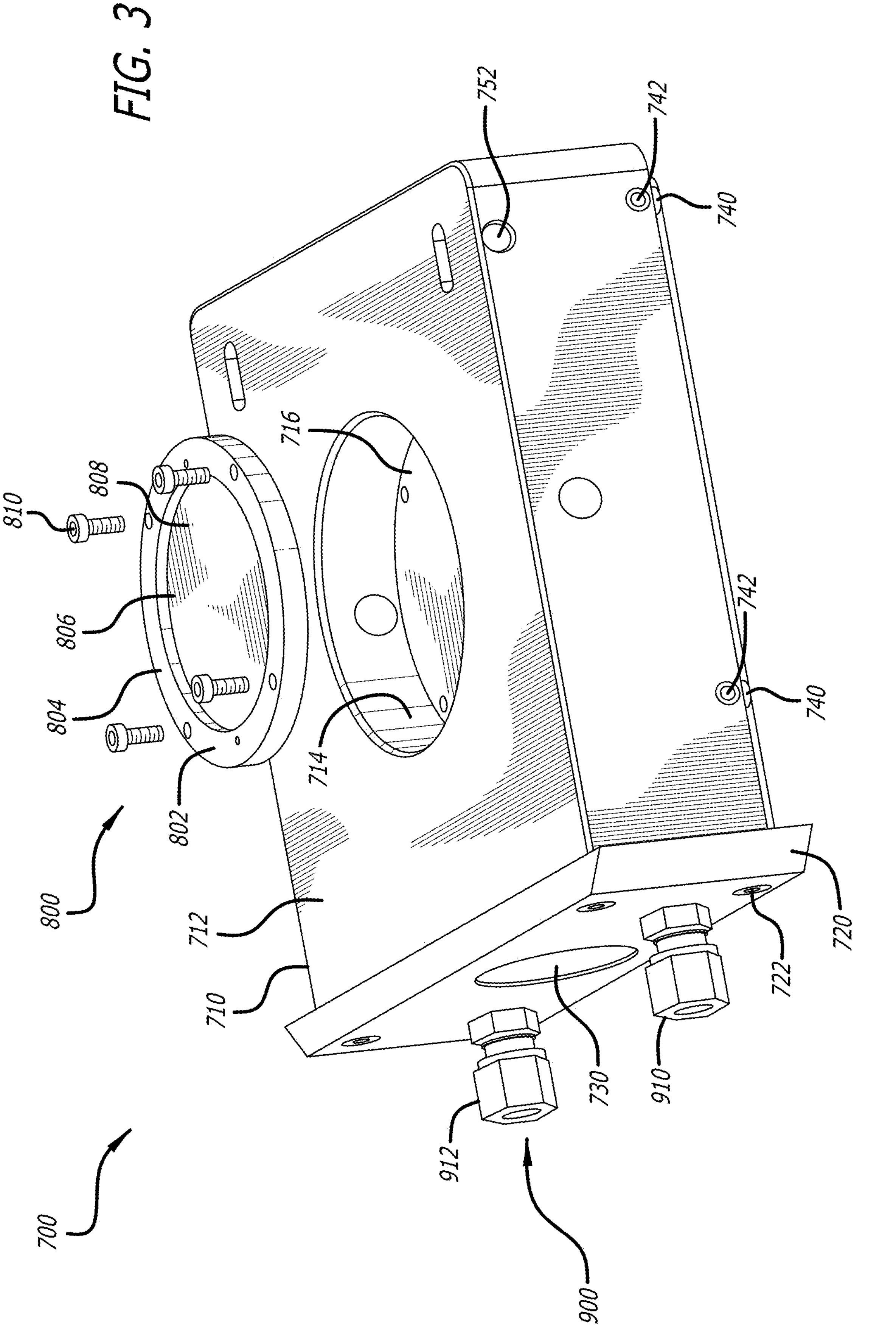
FIG. 3 shows an exploded view of the beam dump assembly shown in FIG. 2.

FIG. 3 shows an exploded view of the beam dump assembly 700. As described above, in the illustrated embodiment, the beam dump assembly 700 includes a beam dump housing 710 and a beam dump body 712. The beam dump body 712 may be contained within the beam dump housing 710, or the beam dump body 712 may function as the beam dump housing 710 (or conversely, the beam dump housing 710 may function as the beam dump body 712). As such, for the purposes of this disclosure, any mechanical feature formed in the beam dump housing 710, or any component attached thereto, may be alternatively considered as being formed on or attached to the beam dump body 712. At least one recess 714 is formed in the beam dump body 712, the recess 714 configured to accept at least one absorber 800 to be retained therein. In the illustrated embodiment, the beam dump body 712 operates as the primary heat sink of the beam dump assembly 700. As such, the beam dump body 712 may be formed from any material having high heat capacity and/or high heat conductivity properties. Exemplary materials for the beam dump body 712 include, without limitation, aluminum, copper, copper tungsten, tungsten carbide, steel, and any variety of ceramic or composite materials. In one embodiment, the beam dump body 712 may also be formed of a material configured to store thermal energy via a phase change mechanism, such as salt that is configured to change from a solid state to a liquid state as it absorbs thermal energy. In another embodiment, the beam dump assembly 700 may include multiple beam dump bodies. In yet another embodiment, the beam dump body 712 may include multiple recesses formed therein. In other embodiments, the beam dump body 712 may be formed from materials having medium-to-low heat capacity and/or medium-to-low conductivity properties.

In the illustrated embodiment, the beam dump housing 710 includes a front plate 720 attached to the beam dump housing 710 or the beam dump body 712 by one or more fasteners 722. One or more handles or gripping members (not shown) may be attached to the front plate 720 to facilitate removal of the beam dump assembly 700 from the beam dump receiver 720. In the illustrated embodiment, the front plate 720 further includes a temperature indicator 730 configured to alert the system operator that the beam dump assembly 700 has reached a designated temperature so that it should be removed from the beam dump receiver 270. In one embodiment, the temperature indicator 730 is provided as a color-changing indicator that turns a bright color when the beam dump body 712 reaches a predetermined temperature. In another embodiment, the temperature indicator 730 is configured to provide a different indication or warning that the threshold temperature has beam reached (e.g., by flashing on and off, or sending a signal to the controller 1000). In another embodiment, the temperature indicator 730 may include a display configured to display the temperature of the beam dump body 712 (e.g., in degrees Fahrenheit or Celsius). In another embodiment, the beam dump housing 710 may not include a front plate, and the temperature indicator 730 may be positioned in the beam dump housing 710 or the beam dump body 712. Those skilled in the art will appreciate that the temperature indicator 730 may be provided as any variety of temperature indicators. In other embodiments, the indicator 730 may display various performance information about the beam dump assembly 700, such as the hours of operation the beam dump assembly 700 has been used. Those skilled in the art will appreciate that the indicator 730 may be used to convey any variety of information to the user or operator of the apparatus 100.

In the illustrated embodiment, one or more rollers or similar devices or features 740 are mounted and retained in the bottom edge of the beam dump housing 710 or the beam dump body 712 by corresponding coupling members or fasteners 742. In this embodiment, the rollers 740 are configured to roll along the housing base 280 or otherwise permit movement of the beam dump body relative to the housing base 280, between the guide members 282 of the housing base 280 (shown in FIG. 2), thereby facilitating the removal of the beam dump assembly 700 and providing consistent positioning of the beam dump assembly 700 within the beam dump receiver 270, or so that the absorber 800 is located consistently relative to the transmitted window optical signal 764 during operation. In the illustrated embodiment, the rollers are made from Teflon. In another embodiment, the rollers 740 may be made from another polymer designed for high temperature operation (e.g., polyether ether ketone (PEEK)). Those skilled in the art will appreciate that the rollers 740 made be made from any variety of materials. In another embodiment, the rollers 740 may not be used, and the beam dump assembly 700 may slide along the upper surface of the housing base 280.

In the illustrated embodiment, the absorber 800 includes an absorber body 802 with a raised region 804 and a recessed region 806 formed thereon. A coating 808 may be applied to the recessed region 806 of the absorber body 802, the coating 808 being operative to control or optimize the absorption of the optical radiation incident thereon. In one embodiment, the coating 808 may be operative to protect the absorber body 802 from being damaged by the transmitted window optical signal 764 described above. One or more surface features, (not shown) configured to enhance the absorption of the transmitted window optical signal 764 may be formed on the recessed region 806 of the absorber body 802 and coated with the coating 808. Optionally, the recessed region 806 may not include a coating or any surface features. In the illustrated embodiment, a conductive member 716 is placed between the absorber body 802 and beam dump body 712 to facilitate the transfer of thermal energy from the absorber 800 to the beam dump body 712. In the illustrated embodiment, the conductive member 716 is provided as a solid disk of material. Optionally, the conductive member 716 may be provided as an annular disk or washer. A plurality of fasteners 810 are provided to securely retain the absorber body 802 in thermal communication with the conductive member 716 and the beam dump body 712. The conductive member 716 and the absorber body 802 may be formed from any material having high heat capacity and/or high heat conductivity properties. Exemplary materials for the conductive member 716 and the absorber body 802 include, without limitation, aluminum, copper, brass, bronze, copper tungsten, tungsten carbide, steel, metal alloys, or a variety of ceramic or composite materials. Those skilled in the art will appreciate that the conductive member 716 may be formed of any variety of materials. In some embodiments, the conductive member 716 may not be used, and the absorber body 802 may instead be placed in direct thermal contact with the beam dump body 712.

As described above, one of the advantages of the beam dump assembly 700 is its ability to absorb and store a significant amount of thermal energy without the use of an active cooling system. Nevertheless, in some embodiments, the beam dump body 712 may include one or more cooling systems or features configured to conduct thermal energy away from the beam dump body 712. In one embodiment, a fluid cooling system 900 may be provided that includes an inlet fitting 910 in fluid communication one or more cooling channels (not shown) formed in the beam dump body 712. A cooling fluid (e.g., air, inert gas, water, ethylene glycol, and the like) may enter the beam dump body 712 via the inlet fitting 910 and exit an outlet fitting 912. Optionally, no fluid cooling may be used. In another embodiment, one or more thermoelectric coolers (not shown) may be provided, the thermoelectric coolers configured to conduct heat away from the beam dump body 712. In another embodiment, one or more heat pumps operative to remove heat from the beam dump body 712 may be provided. In another embodiment, forced-air convection may be used to remove heat from the beam dump body 712 through the vent 290. Such a forced-air convention system may include sources of flowing air (e.g., a fan) operative to supply a flow of air over one or more heat sinks or cooling fins (not shown) formed on or in thermal communication with the beam dump body 712.

During use of the apparatus 100, when the temperature of the beam dump body 712 reaches a threshold level, (e.g., as indicated by the temperature indicator 730), the operator of the apparatus 100 may remove the locking pins 750, manually remove the beam dump assembly 700 from the beam dump receiver 270, and replace the beam dump assembly 700 with a cool beam dump assembly 700. The hot beam dump assembly 700 may be cooled by any variety of methods, (e.g., by immersion in water, placement in a refrigerated space, or by radiation of its heat into the ambient environment). Optionally, the beam dump assembly 700 may be removed and replaced using an automated process (e.g., robotically).

When provided as described in any of the embodiments above, the apparatus 100 may be configured for a variety of modes of operation. In one exemplary mode of operation, with reference to FIGS. 1 and 2, the apparatus 100 is configured to measure the characteristics of an incident beam of laser energy 10 having a wavelength of 1064 nanometers and a maximum optical power of about 1 kW propagating through the aperture optic 224. In this mode of operation, the first optical module 500 is provided with a camera-based beam profiler as the optical sensor 510, and the fourth optical module 600 is provided with an optical power meter as the fourth optical sensor 610. In this mode of operation, the optical component 502 of the first optical module 500 is provided as an optical wedge beamsplitter having one optical surface with an anti-reflective coating configured to reflect about 0.5% of the incident beam of laser energy 10 and transmit about 99.5% of the incident beam of laser energy therethrough. The opposing optical surface of the optical wedge is oriented at an angle (e.g., about 7°) relative to the first optical surface. When configured as such, any reflections from the opposing optical surface of the optical wedge 502 are not directed to the beam profiler 510.

In this mode of operation, with the optical components provided as described above, the beam of laser energy 10 is incident on the optical component 502 of the first optical module 500, and the optical component 502 reflects a reflected first optical module signal 504 having a power of about 5 W, and allows a transmitted first optical module signal 508 having a power of about 995 W to propagating therethrough. The reflected first optical module signal 504 is incident on the third optical module 400. The third optical module 400 is provided as an auxiliary beam dump 410 having an optical component 402 provided as an optical wedge configured to direct about 99.8% of the light incident on it to propagate therethrough to an auxiliary beam dump 410 and reflect (or transmit or otherwise direct) about 0.02% of the light incident on it toward the beam profiler 510. As such, the optical component 402 directs a third optical module signal 404 having a power of about 4.995 W to the auxiliary beam dump 410 and allows about 0.005 W to propagate therethrough to the optical component 506 that allows a modified reflected first optical module signal 504' to propagate therethrough to the optical sensor 510. During this mode of operation, the operator can monitor the optical power measured by the optical power meter 610 and the beam profile measured by the beam profiler 510 to ensure that these beam characteristics are within the desired operating parameters or tolerances for the process being run by laser processing system.

In this mode of operation, the optical component 302 of the second optical module 300 is provided as a biconvex lens with a focal length of about 20 mm and antireflective coatings on both sides, thereby allowing almost all of the light incident to propagate therethrough. As described above with respect to FIG. 1, one surface of the optical component 762 is left uncoated, resulting in approximately 4-5% (depending on the angle of incidence or reflection, the optical material, and the laser wavelength) of the transmitted first optical module signal 508 being reflected as the reflected window optical signal 766 to the optical power meter 610 of the fourth optical module 600. The optical component 762 allows the transmitted window optical signal 764 to propagate to the beam dump assembly 700, where it is absorbed by the absorber 800 and converted to thermal energy to be stored in the beam dump body 712. In this exemplary mode of operation, after approximately 2 minutes of operation, the beam dump body 712 reaches a predetermined (e.g., through system settings of the apparatus 100) temperature of about 50° C., and the temperature indicator 730 indicates to the operator that the beam dump assembly 700 should be replaced, whereupon the operator shuts down the processing laser, removes the hot beam dump assembly 700 (i.e., a "first" beam dump assembly) from the beam dump receiver 270 and replaces it with a cool beam dump assembly 700 (i.e., a "second" beam dump assembly). The hot beam dump assembly 700 is then allowed to cool so that it can be used again.

In another exemplary mode of operation, the apparatus 100 is configured to measure the characteristics of an incident beam of laser energy 10 having a wavelength of 532 nanometers and a maximum optical power of about 500 W entering the aperture optic 224. The optical sensor 510 is provided as a beam profiler, and the optical sensor 610 is provided as an optical power meter. In this mode of operation, the apparatus 100 may use the same optics and sensors that are used with the previously described mode of operation (wherein the beam of laser energy has a wavelength of 1064 nanometers). Optionally, the apparatus 100 may use optics and sensors that are optimized for use at 532 nanometers.

In yet another exemplary mode of operation, again with reference to FIGS. 1 and 2, the apparatus 100 is configured to measure the characteristics of an incident beam of laser energy 10 having a wavelength of 1064 nanometers and a maximum optical power of about 1 kW propagating through the aperture optic 224. In this mode of operation, the first optical module 500 has an optical sensor 510 provided as a non-contact beam profiling system (e.g., the BEAMWATCH system mentioned above), and the fourth optical module 600 has an optical sensor 610 is provided as an optical power meter. In this mode of operation, because the non-contact beam profiling system 510 measures light that is Rayleigh-scattered from the incident beam of laser energy 10, the optical components 502 and 506 are not required. Likewise, no beam dump is required in the first compartment 230, so a third optical module 400 is not required. Because the optical components 502 and 506 are not used, the non-contact beam profiling system 500 allows a transmitted first optical module signal 508 to propagate therethrough having an optical power essentially identical to the of 1 kW of the incident beam of laser energy 10 propagating through the aperture optic 224.

In this mode of operation, similar to the earlier described mode of operation, the optical component 302 of the second optical module 300 is provided as a biconvex lens with a focal length of about 20 mm and antireflective coatings on both sides, thereby allowing almost all of the optical power light to propagate therethrough. Also, one surface of the optical component 762 is left uncoated, resulting in approximately 4-5% (depending on the angle of incidence or reflection, the optical material, and the laser wavelength) of the transmitted first optical module signal 508 being reflected as the reflected window optical signal 766 to the optical power meter 610. The optical component 762 allows the transmitted window optical signal 764 to propagate therethrough to the beam dump assembly 700, where it is absorbed by the absorber 800 and is converted to thermal energy stored in the beam dump body 712. In this mode of operation, after approximately 2 minutes of operation, when the beam dump body 712 reaches a predetermined temperature of about 50° C., and the temperature indicator 730 indicates to the operator that the beam dump assembly 700 should be replaced, whereupon the operator shuts down the processing laser, removes the hot beam dump assembly 700 (i.e., the "first" beam dump assembly) from the beam dump receiver 270 and replaces it with a cool beam dump assembly 700 (i.e., a "second" beam dump assembly). The first beam dump assembly 700 is then allowed to cool so that it can be used again.

Though the exemplary modes of operation described above may be typical of use of the apparatus 100, those skilled in the art will appreciate that the apparatus 100 may be configured in any way desired or beneficial. If the operator needs to set up the apparatus 100 for operation at a different wavelength or power level, the apparatus 100 can be reconfigured by removing any combination of the aperture assembly 220, the optical modules 300, 400, 500, 600, or the optical window assembly 760, and replacing them with other apertures, optical modules, or windows optimized for the different wavelength or power level.

The foregoing is illustrative of embodiments and examples of the invention, and is not to be construed as limiting thereof. Although a few specific embodiments and examples have been described with reference to the drawings, those skilled in the art will readily appreciate that many modifications to the disclosed embodiments and examples, as well as other embodiments, are possible without materially departing from the novel teachings and advantages of the invention. Accordingly, all such modifications to the subject matter described herein are intended to be included within the scope of the invention as defined in the claims. For example, skilled persons will appreciate that the subject matter of any sentence, paragraph, example or embodiment can be combined with subject matter of some or all of the other sentences, paragraphs, examples or embodiments, except where such combinations are mutually exclusive. The scope of the present invention should, therefore, be determined by the following claims, with equivalents of the claims to be included therein.

What is claimed is:

1. A laser measurement apparatus, comprising:
- a housing including at least one first housing member and at least one second housing member;
- a first compartment formed in the housing;
- a second compartment formed in the housing;
- a first optical module mounted in the first compartment, the first optical module configured to measure a first characteristic of the beam of laser energy; and
- a first beam dump assembly removably positioned in the second compartment, the first beam dump assembly configured to absorb a portion of the beam of laser energy.

2. The laser measurement apparatus of claim 1, further comprising an aperture assembly mounted in the first housing member, the aperture assembly configured to allow a beam of laser energy to propagate therethrough into the first compartment.

3. The laser measurement apparatus of claim 1, further comprising an intermediate housing member formed in the housing, wherein the intermediate housing member is operative to reduce the transfer of thermal energy between the second compartment and the first compartment.

4. The laser measurement apparatus of claim 1, wherein the first characteristic of the beam of laser energy is selected from the group consisting of beam diameter, beam shape, beam parameter product, optical power, optical intensity, beam pulse power, beam pulse energy, beam waist, and beam radius.

5. The laser measurement apparatus of claim 1, wherein the first optical module includes a laser beam profiler.

6. The laser measurement apparatus of claim 1, further comprising a fourth optical module configured to measure a second characteristic of the beam of laser energy.

7. The laser measurement apparatus of claim 6, wherein the second characteristic of the beam of laser energy is selected from the group consisting of beam diameter, beam shape, beam parameter product, optical power, optical intensity, beam pulse power, beam pulse energy, beam waist, and beam radius.

8. The laser measurement apparatus of claim 6, wherein the fourth optical module includes an optical power meter.

9. The laser measurement apparatus of claim 1, wherein the first optical module includes an optical component configured to receive the beam of laser energy and allow a transmitted first optical module signal to propagate therethrough.

10. The laser measurement apparatus of claim 1, further comprising an optical element, wherein the optical element is configured to receive the transmitted first optical module signal and reflect a reflected window optical signal to the fourth optical module and allow a transmitted optical window signal to propagate therethrough into the second compartment.

11. The laser measurement apparatus of claim 1, further comprising a second optical module mounted in the first compartment, the second optical module including an optical component configured to allow the transmitted first optical module signal to propagate therethrough.

12. The laser measurement apparatus of claim 11, wherein the second optical module includes a removable optical mount configured to retain the optical component.

13. The laser measurement apparatus of claim 12, further comprising at least one optical mount receiver configured to removably retain the removable optical mount therein.

14. The laser measurement apparatus of claim 11, wherein the optical component is configured to attenuate the transmitted first optical module signal.

15. The laser measurement apparatus of claim 1, wherein the first beam dump assembly comprises:
- a beam dump body; and
- an absorber in thermal communication with the beam dump body.

16. The laser measurement apparatus of claim 15, wherein the first beam dump assembly is configured to be removed from the second compartment so that a second beam dump assembly can be placed in the second compartment.

17. The laser measurement apparatus of claim 15, wherein the first beam dump assembly further comprises a temperature indicator configured to indicate a temperature of the beam dump body.

18. A laser measurement apparatus, comprising:
- a housing;
- a first optical module including a first optical sensor positioned in the housing, the first optical module configured to measure a first characteristic of a beam of laser energy; and
- a first beam dump assembly removably positioned in the housing, the first beam dump assembly configured to absorb a portion of the beam of laser energy.

19. The laser measurement apparatus of claim 18, wherein the first beam dump assembly is configured to be removed from the housing so that a second beam dump assembly can be placed in the housing.

20. The laser measurement apparatus of claim 18, wherein the first optical module is selected from the group consisting of apertures, attenuators, beam dumps, beam profiling cameras, beam profilers, optical power meters, optical energy meters, beamsplitters, filters, mirrors, lenses, and windows.

21. The laser measurement apparatus of claim 18, wherein the first characteristic of the beam of laser energy is selected from the group consisting of beam diameter, beam shape, beam parameter product, optical power, optical intensity, beam pulse power, beam pulse energy, beam waist, and beam radius.

22. The laser measurement apparatus of claim 18, further comprising a temperature indicator in thermal communication with the first beam dump assembly, wherein the temperature indicator is configured to indicate a temperature of the beam dump assembly.

23. The laser measurement apparatus of claim 22, wherein the second characteristic of the beam of laser energy is selected from the group consisting of beam diameter, beam shape, beam parameter product, optical power, optical intensity, beam pulse power, beam pulse energy, beam waist, and beam radius.

24. The laser measurement apparatus of claim 18, further comprising a fourth optical module positioned in the housing configured to measure a second characteristic of the beam of laser energy.

* * * * *